(12) United States Patent
Sugitani et al.

(10) Patent No.: US 7,004,278 B2
(45) Date of Patent: Feb. 28, 2006

(54) VEHICLE STEERING SYSTEM WITH AN INTEGRAL FEEDBACK CONTROL

(75) Inventors: Nobuo Sugitani, Wako (JP); Osamu Tsurumiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/746,965

(22) Filed: Dec. 24, 2003

(65) Prior Publication Data

US 2004/0200661 A1   Oct. 14, 2004

(30) Foreign Application Priority Data

Dec. 27, 2002   (JP)   .............................. 2002-379543

(51) Int. Cl.
*B62D 5/04*   (2006.01)
(52) U.S. Cl. ...................... 180/402; 180/446
(58) Field of Classification Search ................ 180/402, 180/446
See application file for complete search history.

(56) References Cited

U.S. PATENT DOCUMENTS

| | | | |
|---|---|---|---|
| 6,415,215 B1 | 7/2002 | Nishizaki et al. | |
| 6,505,703 B1 * | 1/2003 | Stout et al. | 180/446 |
| 6,523,637 B1 * | 2/2003 | Nakano et al. | 180/402 |
| 6,625,530 B1 * | 9/2003 | Bolourchi | 701/42 |
| 6,738,699 B1 * | 5/2004 | Yao et al. | 701/41 |
| 6,757,601 B1 * | 6/2004 | Yao et al. | 701/41 |
| 2002/0005314 A1 * | 1/2002 | Takehara et al. | 180/443 |
| 2002/0129988 A1 | 9/2002 | Stout et al. | |
| 2003/0102181 A1 * | 6/2003 | Tokumoto | 180/446 |

FOREIGN PATENT DOCUMENTS

JP   2001-130430   5/2001

* cited by examiner

*Primary Examiner*—Kevin Hurley
(74) *Attorney, Agent, or Firm*—Hamre, Schumann, Mueller & Larson, P.C.

(57) ABSTRACT

In a vehicle steering system, in particular a steer-by-wire system, using a feedback control including an integral control unit in the feedback path, the integral factor of the integral control unit is made variable depending on the condition of the vehicle, road condition and preference of the vehicle operator so that the intensity of the steering reaction from the tires that is applied to the vehicle operator can be optimally adjusted. Thereby, the steering system can reduce the stead-state deviation and improve the stability in holding a steering angle both without any substantial compromise.

9 Claims, 4 Drawing Sheets

VEHICLE STEERING SYSTEM WITH AN INTEGRAL FEEDBACK CONTROL

TECHNICAL FIELD

The present invention relates to a vehicle steering system with an integral feedback control.

BACKGROUND OF THE INVENTION

Those vehicle steering systems in which the steering unit operated by a vehicle operator and the tires are electrically connected to each other for a synchronized action are known as steer-by-wire systems (which are referred to as SBW systems hereinafter). In a SBW system, a target value of the tire steering angle is computed from the displacement of the steering unit given by a vehicle operator from a steering wheel or a joystick, and an actuator that drives a steering linkage is feedback controlled according to the target value so as to achieve a required tire steering angle.

This feedback control essentially consists of a position control that makes the actual value follow the target value, and it has been customary to include an integral control unit in the feedback loop to minimize the steady-state deviation between the target value and actual value (See Japanese patent laid open publication No. 2001-130430).

Because the steering wheel is not mechanically connected to the tires in a SBW system, the vehicle operator is essentially prevented from directly sensing the road reaction to the tires from the steering wheel. If the road reaction applied to the tires is not transmitted to the steering wheel, the vehicle operator may turn the steering wheel even when the tires are kept immobile, for instance, by abutting a curbstone, without becoming aware of such a circumstance so that the target value of the tire steering angle may become excessive. In such a case, the systems would continue the effort to bring the actual tire steering angle closer to the target tire steering angle, and the actuator load may become so excessive that a mechanical failure could ensue in the worst case. Also, the vehicle operator may feel uncomfortable by the fact that the tires would not change direction even though the steering wheel is turned.

As a measure to alleviate such a problem, it has been proposed to simulate a steering reaction by using an electric motor according to the deviation between the steering wheel steering angle and tire steering angle or the steady-state deviation between the target value and actual value in the feedback control, and transmit this reaction to the vehicle operator via the steering wheel.

However, in a system where an integral control is being performed to the end of minimizing the steady-state deviation between the target value and actual value, when the actual value becomes equal to the target value while the steering wheel is held at a certain steering angle, the steering reaction owing to the existence of a deviation between the target value and actual value disappears, and this deprives the vehicle operator of the expected sense of holding the steering wheel at the fixed steering angle. This is a condition that is never produced in the conventional steering system in which the components are all mechanically connected, and the vehicle operator accustomed to the conventional vehicles may not feel comfortable with such a condition.

BRIEF SUMMARY OF THE INVENTION

In view of such problems of the prior art, a primary object of the present invention is to provide a vehicle steering system which can reduce the stead-state deviation and improve the stability in holding a steering angle both without any substantial compromise.

According to the present invention, such an object can be accomplished by providing a vehicle steering system, comprising: steering input member adapted to be manipulated by a vehicle operator; drive motor for applying a steering angle to a tire according to a displacement of the steering input member; steering reaction generating motor for generating a steering reaction that opposes an effort of the vehicle operator to manipulate the steering input member at least in dependence on a deviation between a steering input to the steering input member and an actual tire steer angle; and a feedback control unit provided with an integral control unit in a feedback path thereof for providing a drive force command to the drive motor, the integral control unit being adapted to adjust an integral factor according to one of a member selected from a group consisting of a manual input, a dynamic state variable of the vehicle and a road surface condition.

According to such an arrangement, the degree of the deviation between the target value and actual value of the tire steering angle owing to the change in the load of the drive motor due to such factors as the road surface friction can be adjusted as required so that the intensity of the reaction that is applied to the vehicle operator can be adjusted according to the current operating conditions and road surface conditions. In other words, reducing the integral gain of the position control increases the transmissivity of the road surface information because the steady-state deviation increases and the steering reaction is amplified. Conversely, increasing the integral gain improves the smoothness in the steering effort owing to the reduction in the steady-state deviation.

The integral factor may be adjusted according to various factors such as the vehicle speed, yaw rate, frequency of the road surface irregularity and lateral acceleration. The present invention is particularly favorably applicable to steer-by-wire systems in which the steering input member and tires are synchronized by an electric coupling and there is no mechanical coupling between them.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
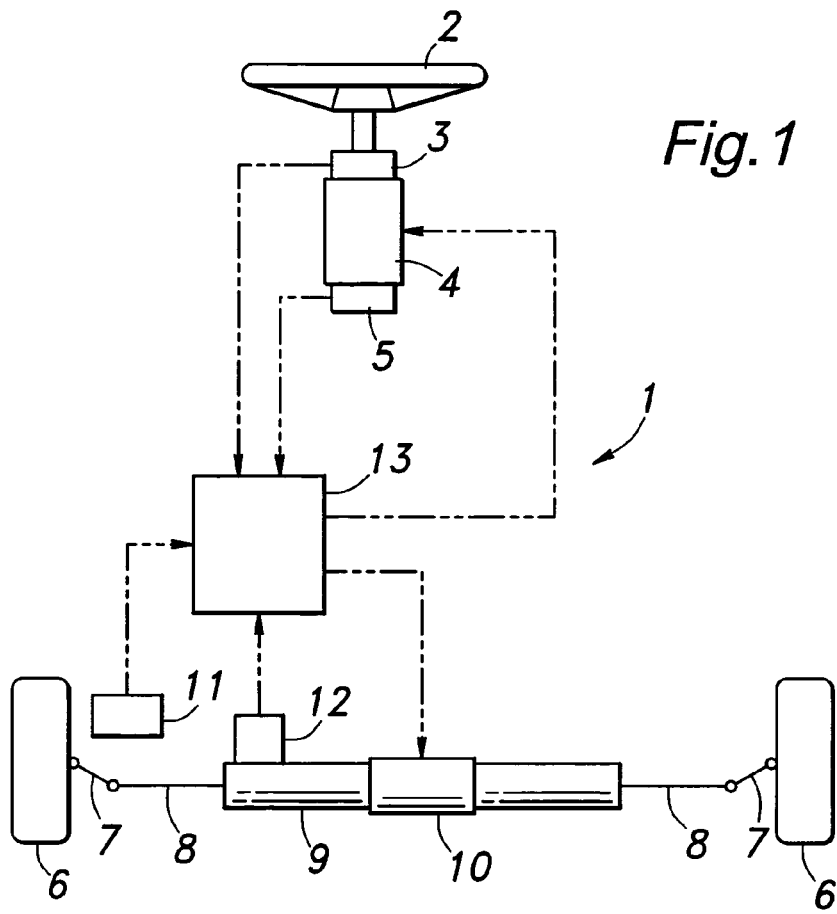
FIG. 1 is a schematic diagram showing the overall structure of a steer-by-wire steering system embodying the present invention.

FIG. 1 illustrates the overall structure of a SBW steering system embodying the present invention. This SBW steering system 1 comprises a steering wheel 2 operated by a vehicle operator, a steering angle sensor 3, a steering reaction generating motor 4 and a steering torque sensor 5 provided in association with the steering wheel 2, a steering rod 9 connected to right and left tires 6 via knuckle arms 7 and tie rods 8, a steering drive motor 10 for steering the tires to a desired angle by axially actuating the steering rod 9, a vehicle speed sensor 11 for producing a vehicle speed signal, a tire steering angle sensor 12 for producing a signal corresponding to the tire steering angle from the axial position of the steering rod 9, and a control unit 13 for controlling the steering reaction generating motor 4 and steering drive motor 10. The steering wheel 2 is normally resiliently urged toward the neutral position by a spring mechanism or the like not shown in the drawing.

Figure 2:
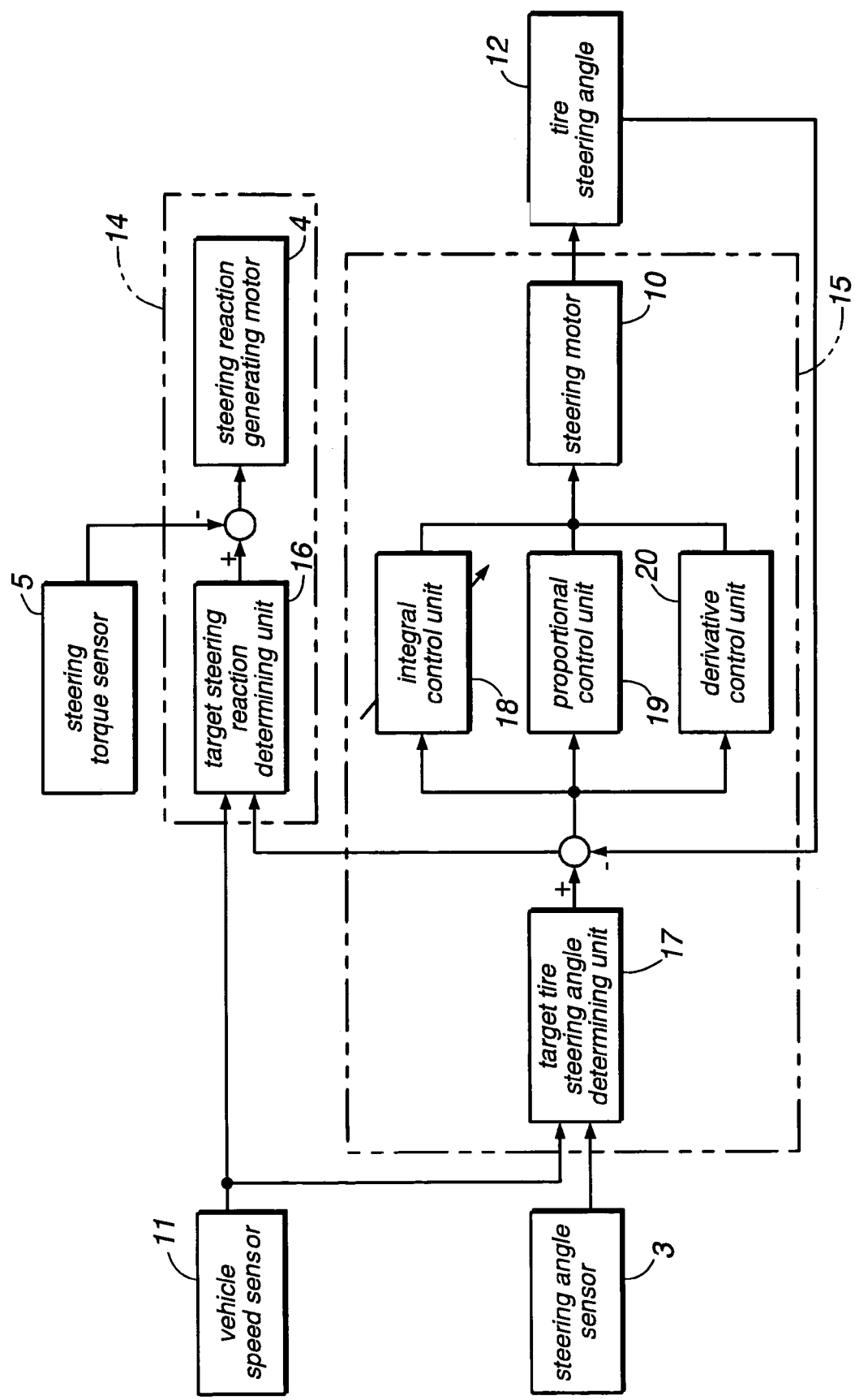
FIG. 2 is a control block diagram of the steer-by-wire steering system.

As shown in FIG. 2, the control unit 13 comprises a steering reaction control unit 14 for controlling the steering reaction generating motor 4 according to the signals from the steering torque sensor 5 and vehicle speed sensor 11, and a steering control unit 15 for controlling the steering drive motor 10 according to the signals from the steering angle sensor 3, vehicle speed sensor 11 and tire steering angle sensor 12 so that the steering reaction generating motor 4 and steering drive motor 10 can be controlled individually.

The steering reaction control unit 14 controls the drive current of the steering reaction generating motor 4 in such a manner that the target steering reaction determined by a target steering reaction determining unit 16 according to the vehicle speed signal from the vehicle speed sensor 11 and the deviation signal corresponding to the deviation between the target value and actual value of the tire steering angle is made to agree with the output value (actual steering torque) of the steering torque sensor 5. Thereby, a force (reaction force) opposing the force applied to the steering wheel 2 by the vehicle operator is produced. This steering reaction force may be made progressively greater as the steering angle of the tires 6 increases. Also, the steering reaction force may be made relatively large when the vehicle speed is high, and relative small when the vehicle speed is low. By thus continuously controlling the steering reaction, it is possible to make the vehicle operator feel as if the steering wheel 2 were directly mechanically connected to the tires 6.

The steering control unit 15 determines a target tire steering angle according to the steering input signal from the steering angle sensor 3 accounting for both the displacement and direction and the vehicle speed signal from the vehicle speed sensor 11 at a target tire steering angle determining unit 17, and controls the drive current of the steering drive motor 10 so as to optimize the deviation between this target tire steering angle and actual tire steering angle produced from the tire steering angle sensor 12 according to the current operating condition of the vehicle while an integral control unit 18, proportional control unit 19 and derivative control unit 21 provide a suitable amount of compensation. Thereby, the optimum tire steering angle for each given steering input to the steering wheel 2 is determined, and the steering drive motor 10 is feedback controlled accordingly.

Figure 3:
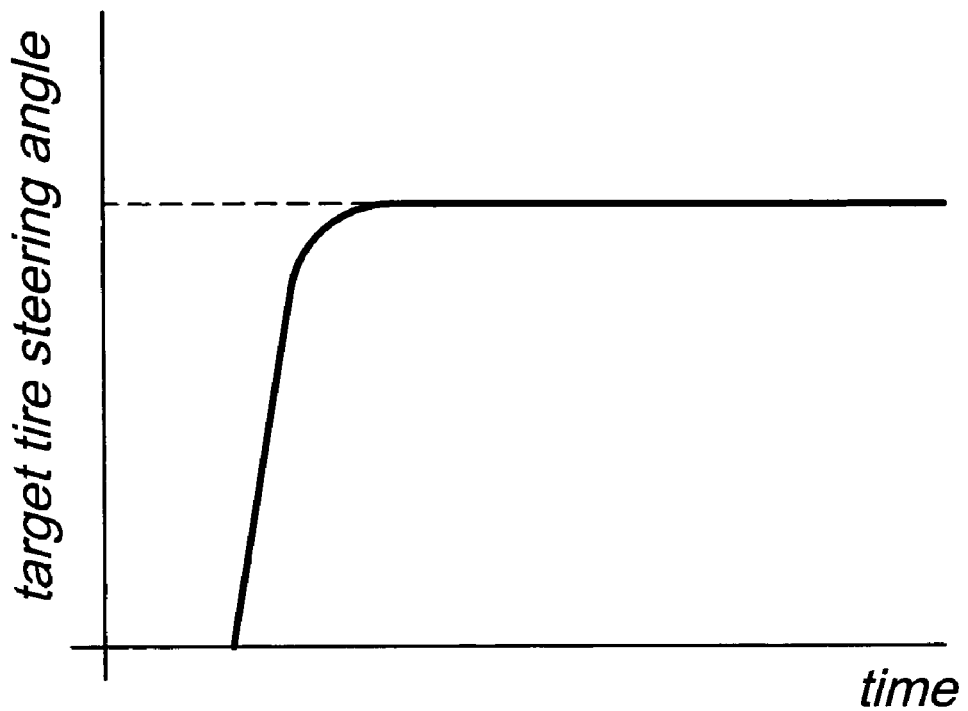
FIG. 3 is a graph showing the relationship between the deviation and reaction force when the integral effect is increased.
Figure 3:
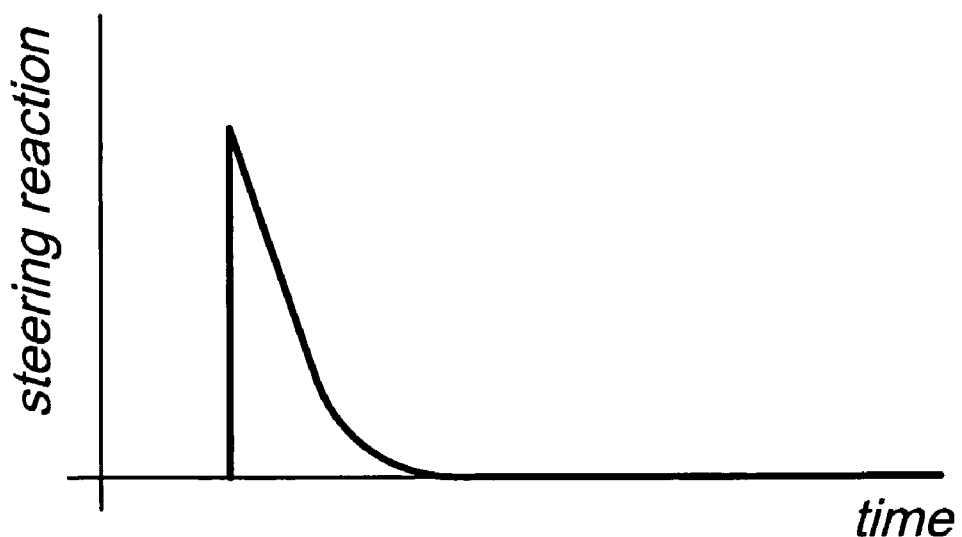
Figure 4:
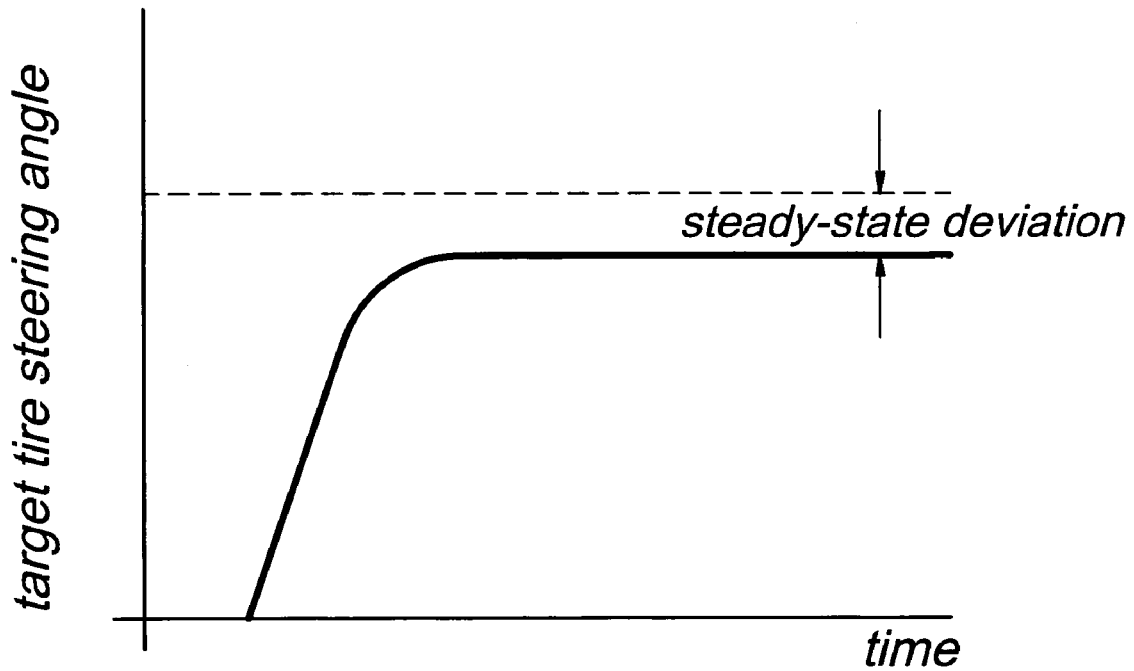
FIG. 4 is a graph showing the relationship between the deviation and reaction force when the integral effect is decreased.
Figure 4:
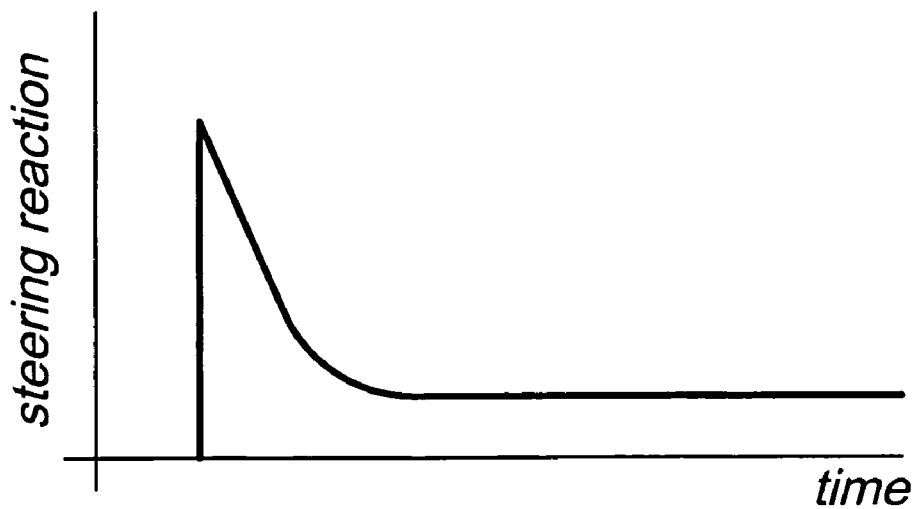

When an integral control unit is used for the tire steering angle control in a SBW system, by suitably selecting the gain of the integral control unit 18, the effect of integral control may be increased so as to minimize the steady-state deviation, but the steering reaction may be reduced (see FIG. 3). On the other hand, if the gain of the integral control unit 18 is reduced, the steady-state deviation may be increased, but the suitable amount of steering reaction may be ensured (see FIG. 4). In other words, by suitably selecting the cut-off property of the integral factor of the control unit depending on such dynamic state variables of the vehicle as the yaw rate, lateral acceleration and vehicle speed, it is possible to achieve both a favorable transmissivity for the road surface information and a smooth steering impression free from road surface noises and interferences for each particular operation condition.

For instance, in a low speed range where a minimized steering effort is desired over the transmissivity of road surface information, the steady-state deviation should be minimized by increasing the integral effect. In a medium speed range where the vehicle travels on a winding road and relatively high yaw rates are produced or in a case where a steering input has started to be applied while the vehicle is traveling at a high speed, the integral effect should be minimized while a relatively large steady-state deviation is produced because it is more important to achieve a high transmissivity for the road surface information or to let the vehicle operator sense the road surface information for a favorable control of the vehicle.

When a vehicle is subjected to a lateral acceleration with a certain steering angle, the steering angle is typically slightly reduced owing to the flexibility in the steering system (which is sometimes referred to as side force steer). This can be used in the wheel suspension design for the purpose of increasing the lateral stability, typically providing a suitable amount of flexibility in the bushes used in the suspension system. According to a certain aspect of the present invention, the steer-by-wire system can provide such an effect in a way which the conventional design relying on the flexibility of the bushes cannot provide. The integral factor may be selected to be large so that the effective rigidity of the steering system may be increased when the lateral acceleration is relatively small, and to be small so that the integral effect may be enhanced when the lateral acceleration is relatively great.

Similarly, the integral factor may be selected to be large for an increased effective rigidity of the steering system when the vehicle speed is in a low to medium range so that the responsiveness of the vehicle may be enhanced, and to be small when the vehicle speed is in a relatively high range so that the side force steer effect and hence the lateral stability of the vehicle may be enhanced. Alternatively or additionally, the integral factor may be selected to be large for an increased effective rigidity of the steering system when the yaw rate is relatively low and reduced with an increased yaw rate, if necessary, with a certain time delay. Thereby, the effective steering rigidity is maintained in an initial phase of an increase in the yaw rate for a high responsiveness, and is thereafter reduced as the yaw rate has fully increased so that the resulting enhancement of the side force may increase the lateral stability of the vehicle.

For instance, a strain gauge may be attached to the suspension spring so that the vibratory input from the road surface to the tires may be detected according to the deflection of the suspension spring, and the cut-off property of the integral effect may be adjusted according to the road surface information obtained from this vibratory input. If the integral gain is set relatively high in a high frequency region, the road surface noises are prevented from reaching the steering wheel 2. Conversely, if the integral gain is set relatively high in a low frequency region, the sense of holding the steering wheel can be prevented from being lost.

Figure 5:
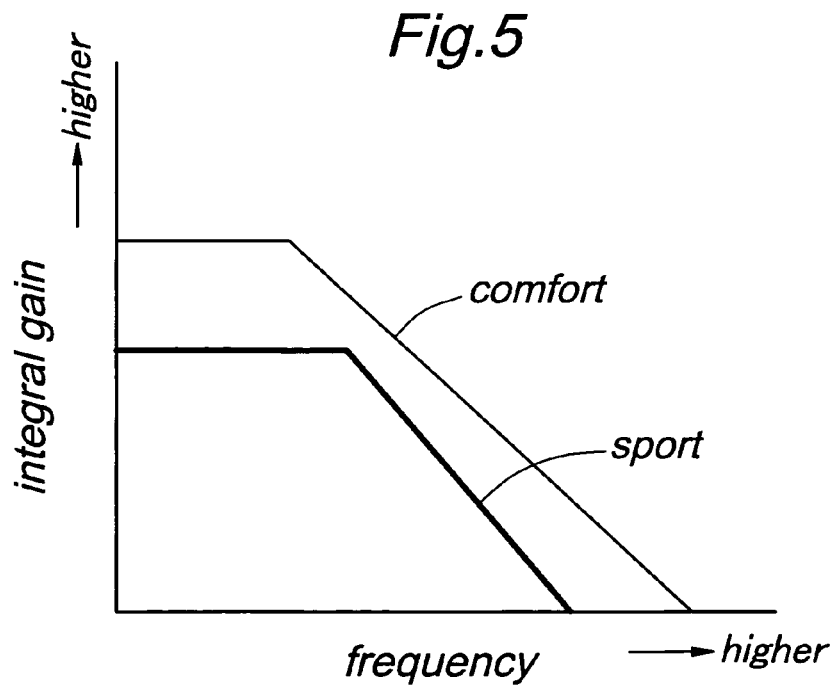
FIG. 5 is a graph showing the relationship between integral gain frequency for both a sport and comfort vehicle.

If the relationship between the frequency and integral gain is allowed to be varied depending on the particular make of the vehicle or depending on the preference of the user even when the vehicle is the same as shown in FIG. 5, it is possible to achieve both a sporty impression and a luxurious or comfortable impression depending on the way the integral effect is applied. It is desirable to set a suitable limit value to the maximum value of the integral gain so that at least a small amount of steering reaction may be ensured at all times.

The control process according to the present invention deliberately produces a steady-state deviation from the target tire steering angle, and such an increase in the steady-state deviation would be perceived by the vehicle operator as a diminishment of the actual tire steering angle for the given steering input to the steering wheel or as an under-steer tendency. In such a case, the vehicle operator typically would turn the steering wheel a little more so that the intended path of travel (the intended tire steering angle) may be eventually achieved. Therefore, such an increase in the steady-state deviation would not substantially affect the impression of the vehicle operation.

Thus, according to the present invention, by varying the integral control effect in the computing unit for the position control of the tire steering angle, the degree of deviation between the target value and actual value can be controlled at will. By varying the integral effect, it is possible to suppress the steering reaction by increasing the integral effect in an operating range where the steering effort is desired to be minimized as is the case when the steering effort is applied while the vehicle is stationary, or to enhance the smooth steering impression by deliberately increasing the integral effect when the vehicle is traveling on a bumpy road surface. When a sporty driving impression is desired, the integral effect may be deliberately reduced so as to increase the deviation, increase the transmissivity for the information on the behavior of the vehicle from the road surface and improve the steering stability in a high vehicle speed range. In particular, when the present invention is applied to a steer-by-wire steering system, the unfamiliar impression owing to the difference from the fully mechanically connected conventional steering system can be effectively minimized.

Although the present invention has been described in terms of a preferred embodiment thereof, it is obvious to a person skilled in the art that various alterations and modifications are possible without departing from the scope of the present invention which is set forth in the appended claims.

What is claimed is:

1. A vehicle steering system, comprising:
   steering input member manipulated by a vehicle operator;
   drive motor applying a steering angle to a tire according to a displacement of the steering input member;
   steering reaction generating motor generating a steering reaction that opposes an effort of the vehicle operator to manipulate the steering input member at least in dependence on a deviation between a steering input member and an actual tire steer angle; and
   a feedback control unit provided with an integral control unit in a feedback path thereof providing a drive force command to the drive motor, the integral control unit adjusting an integral factor according to one of a member selected from a group consisting of a manual input, a dynamic state variable of the vehicle and a road surface condition.

2. A vehicle steering system according to claim 1, wherein the steering input member is not mechanically connected to the vehicle tire.

3. A vehicle steering system according to claim 1, wherein the integral factor is decreased when the vehicle is experiencing a relatively high yaw rate while traveling at a a medium speed.

4. vehicle steering system according to claim 1, wherein the integral factor is decreased immediately after the vehicle is started to be steered at a high speed.

5. vehicle steering system according to claim 1, wherein the integral factor is increased when the road surface condition is such that a vehicle tire receives a relatively large high frequency component from the road surface.

6. vehicle steering system according to claim 1, wherein the integral factor is decreased when the road surface condition is such that a vehicle tire receives a relatively large low frequency component from the road surface.

7. A vehicle steering system according to claim 1, wherein the integral factor is increased when a lateral acceleration is relatively small, and decreased when a lateral acceleration is relatively great.

8. A vehicle steering system according to claim 1, wherein the integral factor is increased when the vehicle speed is in a low to medium range, and decreased when the vehicle speed in a high range.

9. A vehicle steering system according to claim 1, wherein the integral factor is increased when the yaw rate is relatively low and reduced with an increased yaw rate.

* * * * *